United States Patent
Takahashi et al.

(10) Patent No.: US 8,602,724 B2
(45) Date of Patent: Dec. 10, 2013

(54) GAS TURBINE PLANT

(75) Inventors: Tatsuji Takahashi, Hyogo (JP); Naoki Hagi, Hyogo (JP); Toshishige Ai, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 386 days.

(21) Appl. No.: 13/056,054

(22) PCT Filed: Jan. 20, 2009

(86) PCT No.: PCT/JP2009/050772
§ 371 (c)(1),
(2), (4) Date: Jan. 26, 2011

(87) PCT Pub. No.: WO2010/084573
PCT Pub. Date: Jul. 29, 2010

(65) Prior Publication Data
US 2011/0135456 A1    Jun. 9, 2011

(51) Int. Cl.
*F01D 11/24* (2006.01)
(52) U.S. Cl.
USPC ............... 415/145; 415/173.1; 415/174.1; 415/176; 415/178
(58) Field of Classification Search
USPC ........... 415/173.1, 174.1, 176, 179, 145, 151, 415/155; 60/782, 806
See application file for complete search history.

(56) References Cited

U.S. PATENT DOCUMENTS

| | | | |
|---|---|---|---|
| 3,966,354 A | 6/1976 | Patterson | |
| 4,849,895 A | 7/1989 | Kervistin | |
| 5,468,123 A | 11/1995 | Guimier et al. | |
| 5,779,436 A | 7/1998 | Glezer et al. | |
| 7,269,955 B2 | 9/2007 | Albers et al. | |
| 7,823,389 B2 | 11/2010 | Seitzer et al. | |
| 2005/0050901 A1 | 3/2005 | Little | |
| 2005/0076649 A1 | 4/2005 | Little et al. | |

FOREIGN PATENT DOCUMENTS

| | | |
|---|---|---|
| EP | 0 564 135 A2 | 10/1993 |
| JP | 5186615 | 7/1976 |
| JP | 62182444 | 8/1987 |
| JP | 0754669 | 2/1995 |
| JP | 1077804 | 3/1998 |
| JP | 200663982 | 3/2006 |
| JP | 3825279 | 9/2006 |
| JP | 2008121684 | 5/2008 |

OTHER PUBLICATIONS

Decision to Grant in corresponding Japanese Patent Application No. 2010-547334, which issued on Dec. 4, 2012.

(Continued)

*Primary Examiner* — Ninh H Nguyen
(74) *Attorney, Agent, or Firm* — Kanesaka Berner & Partners, LLP

(57) ABSTRACT

Provided is a gas turbine plant that enables active clearance control for ensuring tip clearance of first-stage turbine rotor blades required during start-up and for achieving the minimum tip clearance during load operation. In a gas turbine plant including a cooler in an air system used for cooling second-stage turbine stator blades, a first-stage segmented ring and a second-stage segmented ring that oppose tips of first-stage turbine rotor blades and second-stage turbine rotor blades are supported by the same blade ring member, and a cooling-air for the second-stage turbine stator blades forms a cooling air flow cooling the blade ring, to control thermal expansion of the blade ring and to control the clearance with respect to the tips.

5 Claims, 5 Drawing Sheets

(56) References Cited

OTHER PUBLICATIONS

International Search Report for PCT/JP2009/050772 mailed Mar. 17, 2009.

A European Search Report dated May 31, 2012 in Application No. 09838765.7.

Decision to Grant Patent in corresponding KR2011-7001997, dated Mar. 26, 2013.

GAS TURBINE PLANT

RELATED APPLICATIONS

The present application is a national phase PCT/JP2009/050772, filed Jan. 20, 2009.

TECHNICAL FIELD

The present invention relates to gas turbine plants in which tip clearance control of first-stage turbine rotor blades can be performed.

BACKGROUND ART

Tip clearance in a gas turbine varies depending on the expansion and contraction of rotation-side structural members and stationary-side structural members due to the difference between the temperature during start-up and that during rated operation, and by the centrifugal extension thereof due to the rotation. That is, the variation in the tip clearance is influenced by the temperature at the outlet of a compressor and the temperature of combustion gas, making the clearance of first-stage turbine rotor blades particularly tight.

In a conventional structure, when there is no temperature adjusting means (for example, a steam path) on the stationary side of a turbine unit, the amount of thermal expansion of a blade ring varies depending on the temperature at the outlet of the compressor. Therefore, when the tip clearance during the above-mentioned rated operation is to be minimized, the initial clearance has to be set with no allowance for contact.

Furthermore, in order to deal with the above-mentioned tip clearance, active clearance control (hereinafter referred to as "ACC") for ensuring the tip clearance required during start-up and for achieving the minimum tip clearance during rated operation is performed.

In this ACC, clearance control using steam is performed to increase or decrease the tip clearance of the first-stage turbine rotor blades during operation. More specifically, the clearance is controlled through control of the thermal expansion by heating the blade ring with steam introduced from outside the gas turbine during start-up of the gas turbine and by cooling the blade ring during load operation.

In order to perform the above-mentioned clearance control, an ACC blade ring has, therein, a steam path for heating and cooling. Thus, even if a first-stage blade ring is exposed to a space at the outlet of the compressor, the amount of expansion of the blade ring that may affect the tip clearance is determined by the relationship between the discharge temperature of the compressor and the steam temperature, whereby the amount of thermal expansion of the blade ring can be adjusted. Accordingly, because the tip clearance is increased by heating with steam during start-up and is reduced by cooling with relatively low-temperature steam during load operation, the tip clearance can be adjusted according to the operating conditions (for example, see Patent Citation 1).

Furthermore, a gas turbine is disclosed in which cooling means that cools air for cooling turbine stator blades is provided, and the air cooled by this cooling means is supplied to the turbine stator blades, whereby the amount of discharged air introduced from the air compressor as the air for cooling the turbine stator blades and the amount of air bled from an interstage are reduced to improve the thermal efficiency (for example, see Patent Citation 2).

Patent Citation 1:
The Publication of Japanese Patent No. 3825279

Patent Citation 2:
Japanese Unexamined Patent Application, Publication No. Hei-7-54669

DISCLOSURE OF INVENTION

In the above-described conventional ACC, a pinch point is less likely to be created in the tip clearance of the turbine rotor blades, compared with the conventional technique in which no ACC is performed. However, the conventional ACC has a problem in that there are operational limitations, because steam has to be flowed through the blade ring, which requires waiting until the steam to be used meets certain conditions. Accordingly, gas turbine plants are required to solve this problem and improve the working efficiency of ACC.

The present invention has been made in view of the above-described circumstances, and an object thereof is to provide a gas turbine plant in which active clearance control (ACC) for ensuring the tip clearance of the first-stage turbine rotor blades required during start-up and for achieving the minimum tip clearance during load operation (rated operation) can be performed.

To solve the above-described problem, the present invention employs the following solutions.

A gas turbine plant of the present invention includes a cooler in an air system used for cooling second-stage turbine stator blades. A first-stage segmented ring and a second-stage segmented ring that oppose tips of first-stage turbine rotor blades and second-stage turbine rotor blades are supported by the same blade ring, and a cooling-air for the second-stage turbine stator blades forms a cooling air flow cooling the blade ring, to control thermal expansion of the blade ring and to control the clearance with respect to the tips.

In this gas turbine plant, the first-stage segmented ring and the second-stage segmented ring that oppose the tips of the first-stage turbine rotor blades and the second-stage turbine rotor blades are supported by the same blade ring, and the cooling-air for the second-stage turbine stator blades forms a cooling air flow cooling the blade ring, to control thermal expansion of the blade ring and to control the clearance with respect to the tips. Thus, active clearance control for reducing the tip clearance becomes possible.

In the above-described invention, it is preferable that switching means be provided in the flow path for supplying the cooling air for the second-stage stator blades to allow the cooling air to bypass the cooler during start-up and to allow the cooling air to pass through the cooler during load operation, so that the flow path is switched between different flow paths during start-up and during load operation. That is, in the above-described invention, although the conventional cooling air may be used as the cooling air, by switching the flow path between different flow paths during start-up, in which the cooling air bypasses the cooler, and during load operation, in which the cooling air passes through the cooler, the thermal expansion of the blade ring can be more effectively controlled.

In the above-described invention, it is preferable that high-pressure bleed air from a compressor be introduced as the cooling air, the flow path bypassing the cooler be selected during start-up, and the flow path passing through the cooler be selected during load operation. That is, it becomes possible to perform active clearance control for ensuring the tip clearance of the first-stage turbine rotor blades by using high-temperature cooling air during start-up and for reducing the tip clearance by using low-temperature cooling air that has passed through the cooler during load operation.

In the above-described invention, it is preferable that the switching means that allows high-temperature compressed air introduced from an outlet of the compressor to be used as the cooling air during start-up and that allows the high-pressure bleed air to be introduced and used as the cooling air during load operation be provided, so that the flow path is switched between different flow paths during start-up and during load operation. That is, in the above-described invention, although the conventional cooling air may be used as the cooling air, a more effective method is that high-temperature compressed air introduced from the compressor outlet is used as the cooling air during start-up, and the cooling air is used during load operation. This enables active clearance control for ensuring the tip clearance of the first-stage turbine rotor blades by using high-temperature compressed air, as it is, as the cooling air during start-up and for reducing the tip clearance by using high-pressure bleed air that has been cooled by being allowed to pass through the cooler as the cooling air during load operation.

This gas turbine plant includes the air system used to cool the second-stage turbine stator blades, and the first-stage segmented ring and the second-stage segmented ring that oppose the tips of first-stage turbine rotor blades and second-stage turbine rotor blades are supported by the same blade ring member. The cooling-air for the second-stage turbine stator blades forms a cooling air flow cooling the blade ring member, and the flow path switching means for the cooling air is provided in the cooling-air flow path to switch the flow path used during start-up, in which high-temperature compressed air introduced from the compressor outlet is used as the cooling air, and the flow path used during load operation, in which high-pressure bleed air introduced from the high-pressure stage of the compressor is used as the cooling air. Accordingly, it is possible to perform active clearance control for ensuring the tip clearance of the first-stage turbine rotor blades during start-up by a heating operation using high-pressure, high-temperature compressed air and for reducing the tip clearance during load operation by using relatively low-temperature, high-pressure bleed air as the cooling air.

As has been described, according to the above-described present invention, by providing the cooling-air flow path for the second-stage turbine stator blades in the blade ring that is located on the outer periphery of the first-stage turbine rotor blades and that supports the first-stage segmented ring, the metal temperature of the blade ring can be reduced. At this time, because active clearance control is enabled by switching the cooling air used during start-up and that used during load operation, it is possible to perform a heating operation by raising the temperature of the cooling air and ensure the tip clearance required for the first-stage turbine rotor blades during start-up, and it is possible to achieve the minimum tip clearance during load operation. Accordingly, the need for steam is eliminated in performing active clearance control, solving the problem of having to postpone start-up until the steam to be used meets certain conditions, which improves the working efficiency of the gas turbine.

EXPLANATION OF REFERENCE

Figure 1:
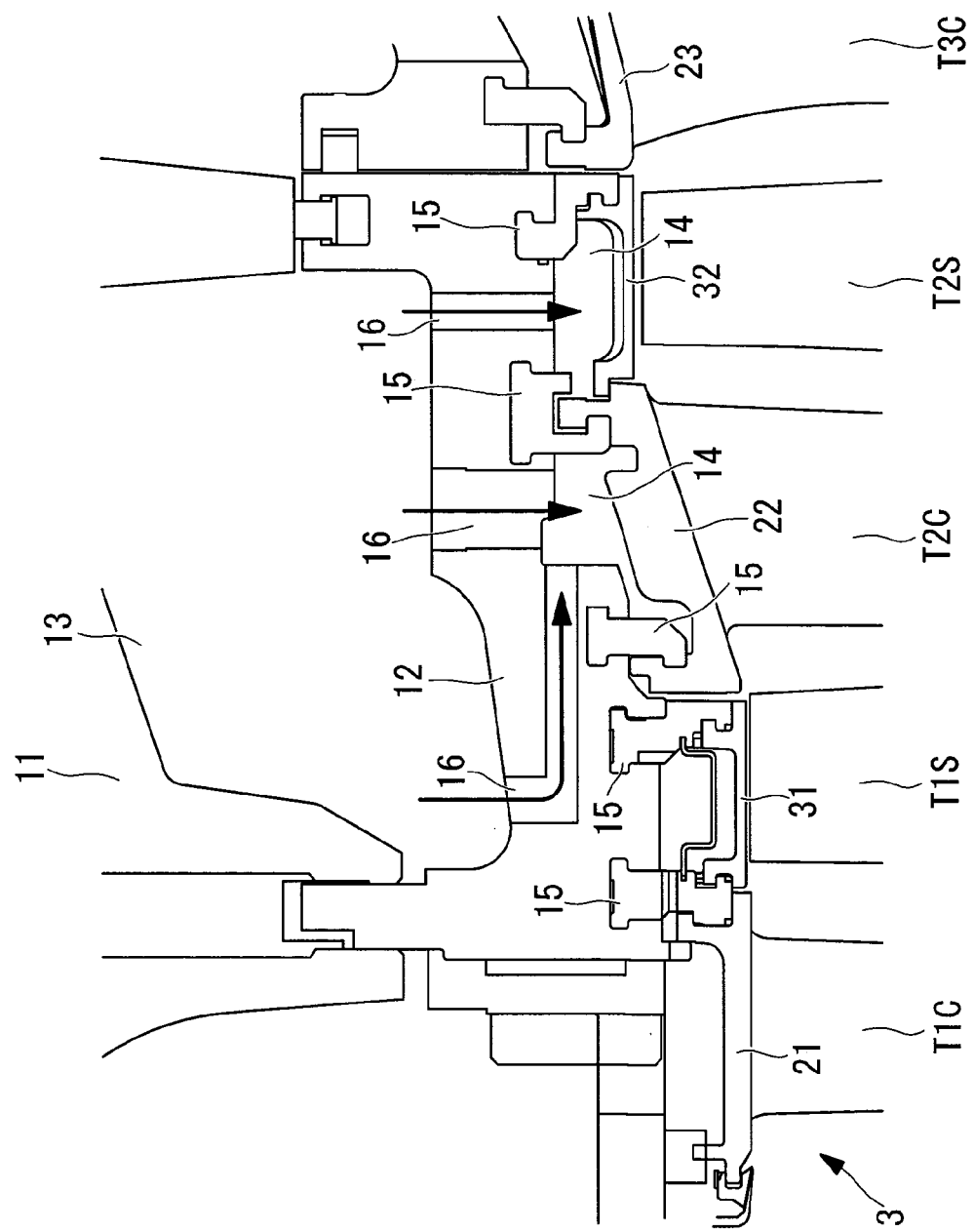
FIG. 1 is a partial sectional view showing an inlet of a turbine according to a first embodiment, which is an embodiment of a gas turbine plant of the present invention.

1: compressor
2: combustor
3: turbine unit
11: outer casing
12: blade ring
13: inflow space
14: space
15: heat shield member
16: through-hole
21: first-stage stator blade
22: second-stage stator blade
23: third-stage stator blade
31: first-stage segmented ring
32: second-stage segmented ring
40, 40A, and 40B: cooling air system
41: main flow path
42: bypass flow path
43, 43A, 48, 48A, and 48B: on/off valve (flow path switching means)
45, 51: cooler
47, 49A, and 49B: connecting tube
50: introduction pipe
T1C: first-stage turbine stator blade
T2C: second-stage turbine stator blade
T1S: first-stage turbine rotor blade

BEST MODE FOR CARRYING OUT THE INVENTION

An embodiment of a gas turbine plant of the present invention will be described on the basis of the drawings.

First Embodiment

Figure 2A:
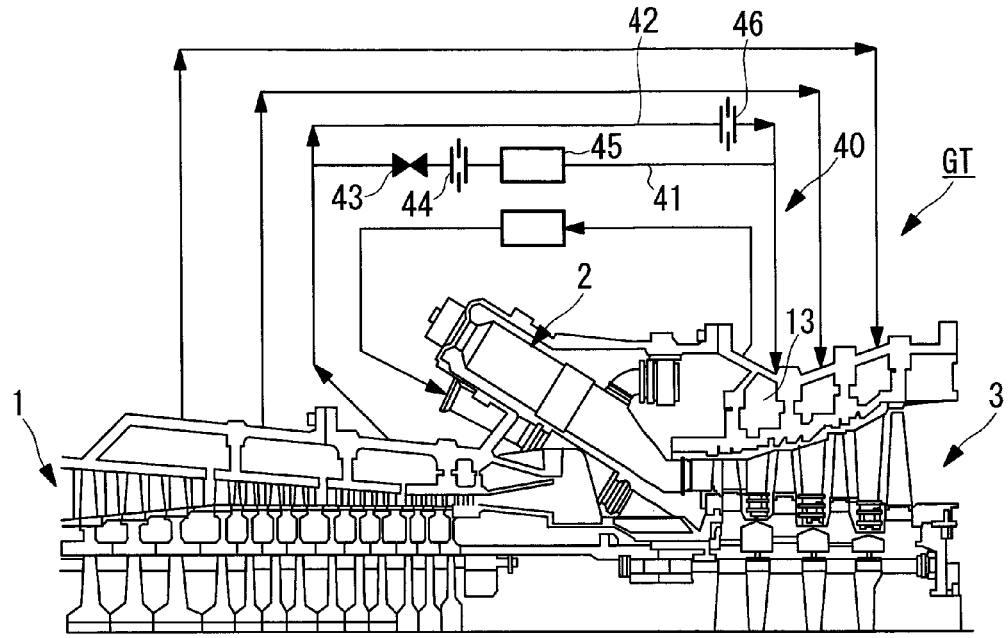
FIG. 2A is a diagram showing a cooling system of a turbine unit according to the first embodiment of the gas turbine plant of the present invention, in which the gas turbine during start-up operation is shown.
Figure 2B:
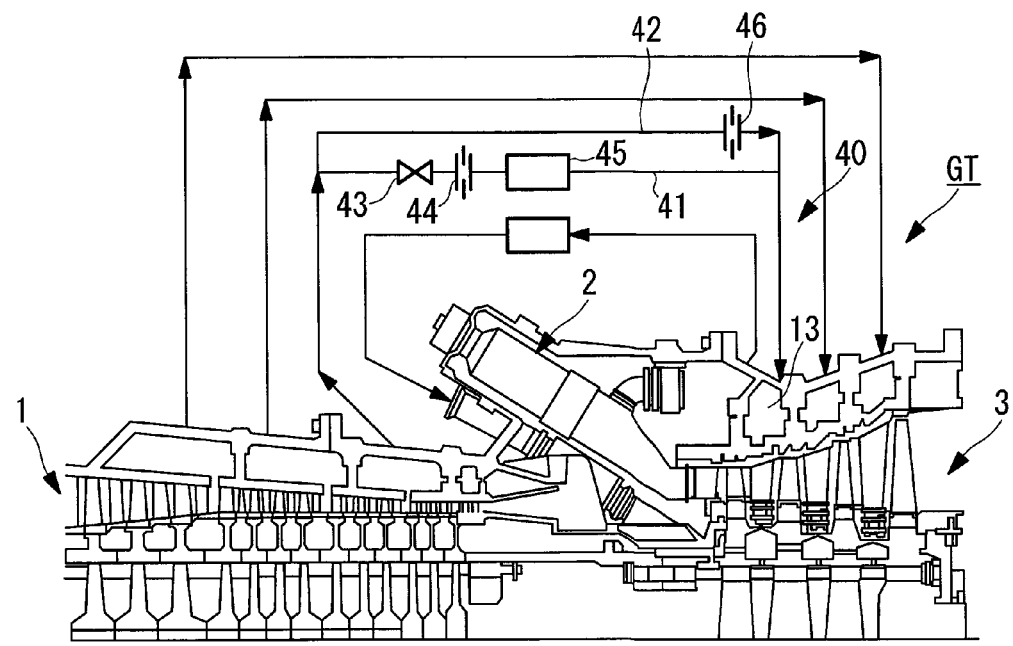
FIG. 2B is a diagram showing the cooling system of the turbine unit according to the first embodiment of the gas turbine plant of the present invention, in which the gas turbine during load operation is shown.

A gas turbine GT shown in FIGS. 2A and 2B includes a compressor 1, a combustor 2, and a turbine unit 3. In this gas turbine GT, air compressed by the compressor 1 is supplied to the combustor 2, and fuel is combusted using the compressed air in the combustor 2. When the thus-produced high-pressure, high-temperature combustion gas is supplied to the turbine unit 3, the combustion gas flows between stator blades and rotor blades of the turbine unit 3, whereby, for example, the thermal energy of the combustion gas can be extracted as shaft output.

FIG. 1 is a partial sectional view showing the inlet of the turbine of the gas turbine GT. Turbine rotors rotate in a casing including an outer casing 11 and a blade ring 12 by allowing the high-pressure, high-temperature combustion gas supplied from the combustor 2 to flow therein.

The cylindrical blade ring 12 has, in sequence from the upstream side in the flow direction of the combustion gas, a plurality of stages of turbine stator blades (first-stage stator blades, second-stage stator blades, and the like) provided on the inner peripheral surface thereof. Furthermore, the turbine rotor has, similarly in sequence from the upstream side in the flow direction of the combustion gas, a plurality of stages of turbine rotor blades (first-stage rotor blades, second stage rotor blades, and the like) provided on the outer peripheral surface thereof. Note that, in the following description, when the stage number of the turbine stator blades (the first-stage stator blades, the second-stage stator blades, and the like) and the stage number of the turbine rotor blades (the first-stage rotor blades, the second stage rotor blades, and the like) are not specified, they are referred to as "stator blades" or "rotor blades", without the numbers indicating the stage numbers.

The first-stage turbine stator blades are supported by a heat shield member 15 attached to the inside of the blade ring 12.

The second-stage turbine stator blades are supported by a heat shield member 15 attached to the inside of the blade ring 12.

A first-stage segmented ring 31 and a second-stage segmented ring 32 are members disposed at positions opposite the tips of the first-stage turbine rotor blades and the tips of second-stage turbine rotor blades, respectively. That is, both the first-stage segmented ring 31 and the second-stage segmented ring 32 are supported by the same blade ring 12 through the heat shield member 15, and the tips of the first-stage turbine rotor blades and second-stage turbine rotor blades rotate along the inner peripheral surfaces of the first-stage segmented ring 31 and second-stage segmented ring 32.

A gap called tip clearance is provided between the first-stage segmented ring 31 and the tips of the first-stage turbine rotor blades and between the second-stage segmented ring 32 and the tips of the second-stage turbine rotor blades, so as to prevent their mutual contact during rotation of the rotors. The value of the tip clearance varies because both members expand and contract due to the difference between the temperature during start-up and that during rated operation of the gas turbine GT.

The above-described second-stage turbine stator blades are provided with an air system 40 for cooling air used for cooling. This cooling air system 40 is connected to the compressor 1 of the gas turbine GT, as shown in, for example, FIGS. 2A and 2B, and bleeds air from high-pressure bleed air.

The cooling air system 40 shown in FIGS. 2A and 2B is a cooling-air flow path for supplying high-pressure bleed air bled from the high-pressure stage of the compressor 1, serving as the cooling air for the second-stage turbine stator blades T2C, to an inflow space 13 defined between the outer casing 11 and the blade ring 12. This cooling air system 40 includes a bypass flow path 42 through which cooling air flows during load operation, the bypass flow path 42 branching off from a main flow path 41 and extending parallel thereto. This bypass flow path 42 may be used as a cooling-air flow path that is selected during start-up and through which the cooling air flows.

The flow paths 41 and 42 used during the load operation of the gas turbine GT are provided with, in sequence from the upstream side near the compressor 1, an on/off valve 43 serving as flow path switching means, a flow control orifice 44, and a cooler 45 that lowers the temperature of high-pressure bleed air, which are arranged in series. Furthermore, the bypass flow path 42 used during start-up of the gas turbine GT has a flow control orifice 46.

The stator blade 22 and the segmented ring 32 are supported by the heat shield member 15 such that a space 14 is provided between the blade ring 12 and the stator blade 22 and the segmented ring 32.

The cooling air passed through the cooling air system 40 and introduced into the inflow space 13 passes through through-holes 16 provided in the blade ring 12 and is introduced to the blade ring 12 and the space 14 that oppose the tips of the first-stage and second-stage turbine rotor blades to cool the blade ring 12.

That is, because the cooling air flows through the through-holes 16 penetrating the blade ring 12 and into the space 14 to cool the blade ring 12, an increase in the tip clearance between these and the tips of the first-stage turbine rotor blades T1S and second-stage turbine rotor blades T2S opposite thereto can be prevented.

In the gas turbine GT having the cooling air system 40 of the above-described configuration, the start-up operation and the load operation are performed as described below.

During the start-up operation of the gas turbine GT, the on/off valve 43 is closed to select the bypass flow path 42, as shown in FIG. 2A. Because it is necessary to raise the temperature of the low-temperature blade ring 12 during the start-up operation, the flow path with which no cooling air passes through the cooler 45 is selected. That is, high-pressure bleed air introduced from the compressor 1 is not cooled by the cooler 45 and is supplied to the inflow space 13 and the space 14 while substantially maintaining its temperature. Because this facilitates heating of the blade ring 12, the start-up time of the gas turbine GT can be reduced to achieve efficient operation.

When the operation moves on to the load operation, the on/off valve 43 is opened to select the main flow path 41 and the bypass flow path 42, as shown in FIG. 2B. As a result, high-pressure bleed air introduced from the compressor 1, serving as the cooling air, passes through the cooler 45 and is cooled, and is supplied to the inflow space 13 and the space 14 in a low-temperature state. Because the blade ring 12 is cooled by the cooling air, the tip clearance formed relative to the tips of the first-stage turbine rotor blades and second-stage turbine rotor blades can be controlled to the optimum value. That is, because the cooling air system 40 through which cooling air for the second-stage turbine stator blades flows is formed on the outer periphery of the first-stage turbine rotor blades, the metal temperature of the blade ring 12 located on the outer periphery of the first-stage turbine rotor blades can be reduced.

Accordingly, it is possible to perform active clearance control (ACC) during operation of the gas turbine GT, in which the tip clearance of the first-stage turbine rotor blades is ensured during start-up by using high-temperature cooling air, and the tip clearance is reduced during the load operation by using low-temperature cooling air that has passed through the cooler 45.

Thus, by effectively using the cooling air system 40 for the second-stage turbine stator blades, which has the cooler 45, and controlling the temperature of the cooling air using the cooler 45, it is possible to control and optimize the variation in the tip clearance caused by the difference between the temperatures during start-up and during load operation.

Furthermore, compared with the conventional ACC using steam, the working efficiency is improved because high-pressure bleed air is used as the cooling air, which eliminates the necessity to wait until the steam conditions are met.

Next, a first modification of the above-described cooling air system 40 will be described on the basis of FIGS. 3A and 3B. Note that, in the description below, parts the same as those in the above-described embodiment will be denoted by the same reference numerals, and detailed descriptions thereof will be omitted.

In a cooling air system 40A according to the first modification, part of the high-temperature compressed air introduced from the outlet of the compressor 1 as the rotor cooling air is used as the cooling air during start-up. Thus, a connecting tube 47 is provided for communicating between an introduction pipe 50 for high-temperature compressed air and the main flow path 41 on the downstream side of the cooler 45 is provided, and an on/off valve 48 serving as flow path switching means is provided in the connecting tube 47.

Furthermore, as the flow path switching means during start-up and during load operation, an on/off valve 43A is provided on the upstream side of a position where the main flow path 41 and the bypass flow path 42 diverge from each other, in addition to the above-mentioned on/off valve 48 in the connecting tube 47.

The gas turbine GT having the cooling air system 40A of the above-described configuration performs the start-up operation and the load operation as described below.

Figure 3A:
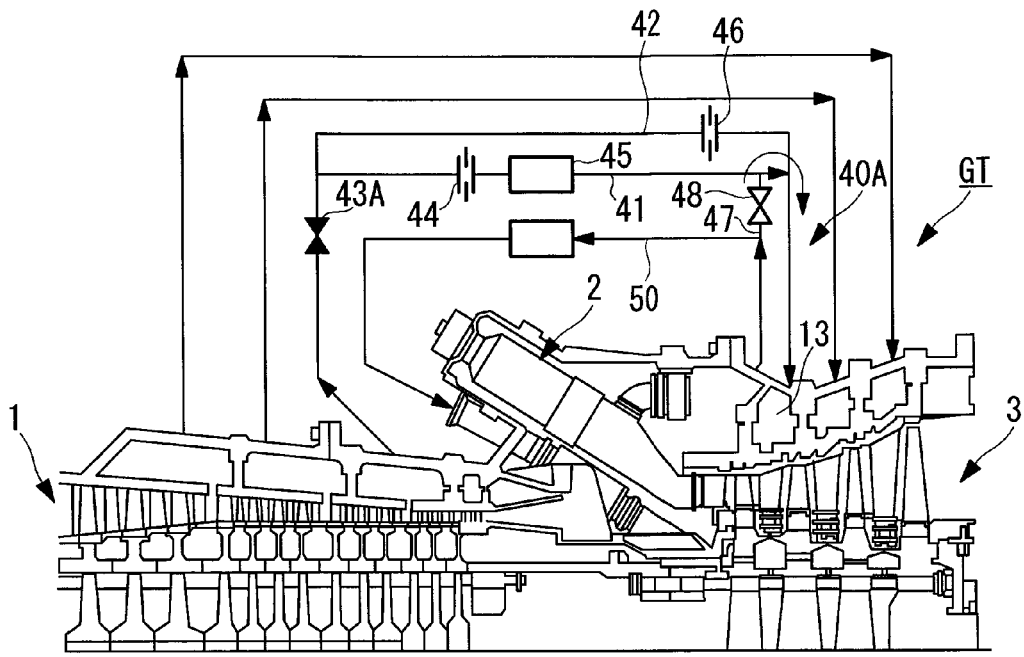
FIG. 3A is a diagram showing a first modification of the cooling system of the turbine unit in FIG. 2, in which the gas turbine during the start-up operation is shown.

During the start-up operation of the gas turbine GT, the on/off valve 43A is closed and the on/off valve 48 is opened to select the connecting tube 47 serving as the flow path for the cooling air, as shown in FIG. 3A. This sends part of the outlet air of the compressor 1 to the inflow space 13 through the connecting tube 47. Because it is necessary to heat the low-temperature blade ring 12 during start-up, a flow path that directly introduces high-temperature compressed air is selected. That is, because high-temperature compressed air introduced from the outlet of the compressor 1 has a higher temperature than high-pressure bleed air, heating of the blade ring 12 can be further facilitated. Accordingly, the start-up time of the gas turbine GT required to heat the blade ring 12 and the like to a predetermined temperature can be further reduced to achieve efficient operation.

Figure 3B:
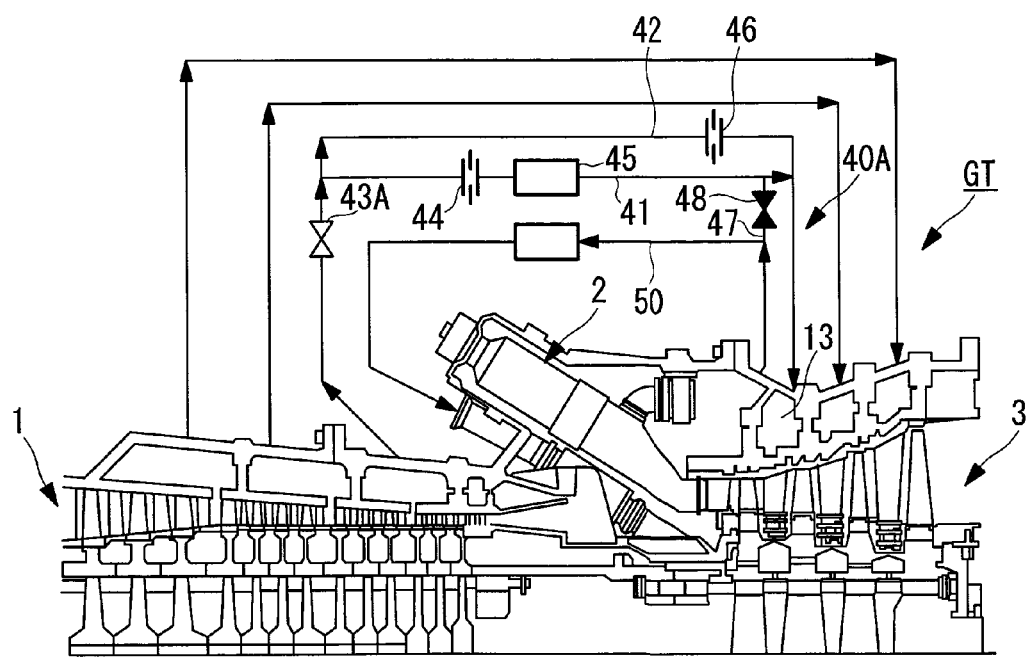
FIG. 3B is a diagram showing the first modification of the cooling system of the turbine unit in FIG. 2, in which the gas turbine during the load operation is shown.

Once the above-described start-up is completed, as shown in FIG. 3B, the on/off valve 43A is opened and the on/off valve 48 is closed to select the main flow path 41 and the bypass flow path 42. As a result, high-pressure bleed air introduced from the compressor 1 as the cooling air is divided into the air passing through the main flow path 41 and the cooler 45 to be cooled and the air passing through the bypass flow path 42. The splitting ratio at this time is determined by the pressure loss of the cooling air caused by passing through the orifices 44 and 46 and the cooler 45, the length of the tubes, etc. Then, high-pressure bleed air that has passed through the cooler 45 to be cooled and high-pressure bleed air that has flowed while maintaining its temperature are combined into a single flow by merging of the main flow path 41 and the bypass flow path 42 and are supplied to the inflow space 13 and the space 14 in a low-temperature state.

Because the blade ring 12 is cooled by low-temperature cooling air, the tip clearance formed relative to the tips of the first-stage turbine rotor blades and second-stage turbine rotor blades can be controlled to the optimum value. That is, because the cooling air system 40 through which cooling air for the second-stage turbine stator blades flows is formed on the outer periphery of the first-stage turbine rotor blades, the metal temperature of the blade ring 12 located on the outer periphery of the first-stage turbine rotor blades is reduced. Thus, it is possible to control variations of the tip clearance and to optimize the tip clearance.

Second Embodiment

Next, a second embodiment of the gas turbine GT of the present invention will be described on the basis of FIGS. 4A and 4B. Note that parts the same as those in the above-described embodiment will be denoted by the same reference numerals, and detailed descriptions thereof will be omitted.

This embodiment is applied to the case where a cooling air system 40B of the second-stage turbine stator blades T2C has no cooler. The blade ring 12 is cooled by cooling air for the second-stage turbine stator blades T2C. The cooling air forms the cooling-air flow paths. Furthermore, in this cooling air system 40B, part of the high-temperature compressed air introduced from the outlet of the compressor 1 as the rotor cooling air is used as the cooling air during start-up. Thus, the cooling air system 40B and the introduction pipe 50 for high-temperature compressed air are connected by a pair of connecting tubes 49A and 49B.

One of the connecting tubes, 49A, connects the cooling air system 40B at the upstream side of the orifice and the introduction pipe 50 at the downstream side of the cooler 51 and has an on/off valve 48A serving as flow path switching means at an intermediate point thereof.

The other connecting tube, 49B, connects the cooling air system 40B at the downstream side of the orifice and the introduction pipe 50 at the upstream side of the cooler 51 and has an on/off valve 48B serving as flow path switching means at an intermediate point thereof.

Furthermore, the on/off valve 43A serving as flow path switching means for high-pressure bleed air used as the cooling air is provided in the cooling air system 40B.

Figure 4A:
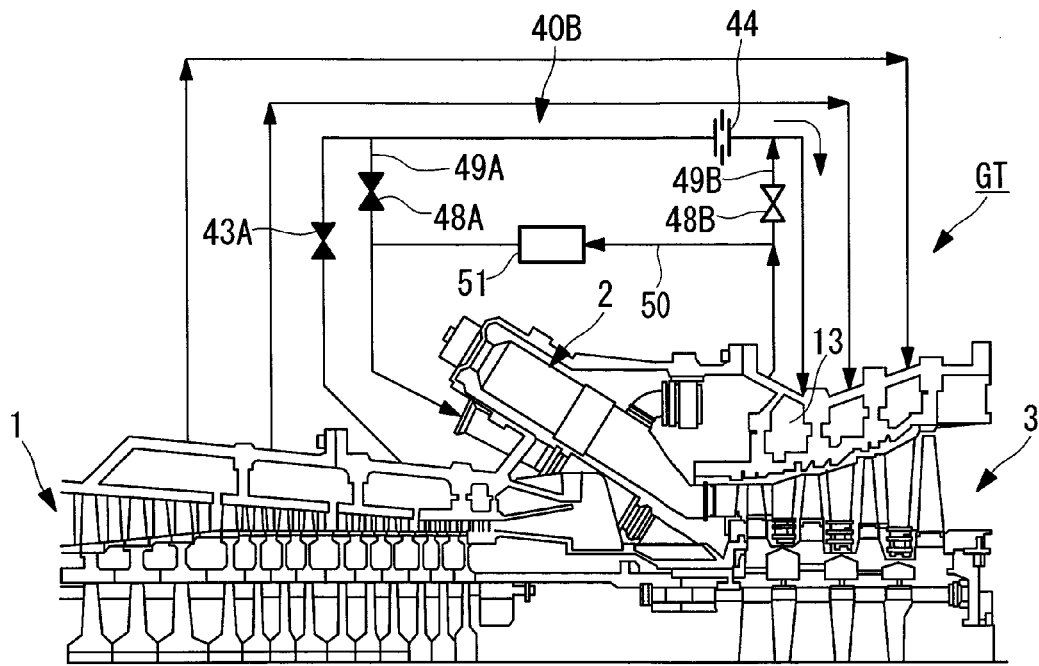
FIG. 4A is a diagram showing a cooling system of a turbine unit according to a second embodiment of the gas turbine plant of the present invention, in which the gas turbine during the start-up operation is shown.

As a result, during start-up, in which part of the rotor cooling air is introduced from the outlet to be used as the cooling air rather than high-pressure bleed air from the compressor 1, as shown in, for example, FIG. 4A, by closing the on/off valves 43A and 48A and opening the on/off valve 48B, part of the high-temperature compressed air introduced as the rotor cooling air is supplied to the inflow space 13 and the space 14 via the on/off valve 48B and the connecting tube 49B. Accordingly, the start-up time of the gas turbine GT required to heat the blade ring 12 and the like to a predetermined temperature can be further reduced to achieve efficient operation.

Figure 4B:
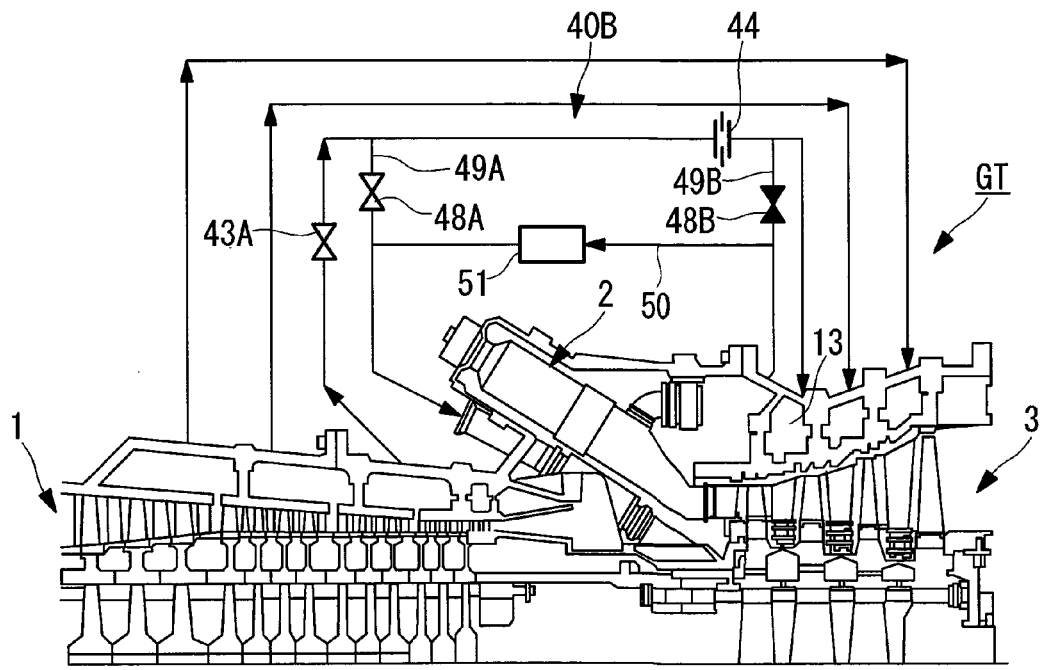
FIG. 4B is a diagram showing the cooling system of the turbine unit according to the second embodiment of the gas turbine plant of the present invention, in which the gas turbine during the load operation is shown.

Furthermore, during the load operation, in which high-pressure bleed air introduced from the high-pressure stage of the compressor as the cooling air is used, by opening the on/off valves 43A and 48A and closing the on/off valve 48B, as shown in, for example, FIG. 4B, the flow path is switched and high-pressure bleed air is supplied as the cooling air to the inflow space 13 and the space 14. If the air temperature has to be reduced, part of the rotor cooling air is mixed with high-pressure bleed air via the introduction pipe 50, the cooler 51, the connecting tube 49A, the on/off valve 48A, and the like to adjust the temperature. Because the blade ring 12 is cooled by relatively low-temperature cooling air, the tip clearance formed relative to the tips of the first-stage turbine rotor blades and second-stage turbine rotor blades can be controlled to the optimum value. That is, because the cooling air system 40B through which cooling air for the second-stage turbine stator blades flows is formed on the outer periphery of the first-stage turbine rotor blades, the metal temperature of the blade ring 12 located on the outer periphery of the first-stage turbine rotor blades can be reduced.

Even in the gas turbine plant of this type, by allowing cooling air for the second-stage turbine stator blades to flow through the through-holes 16 provided in the blade ring, and by providing the on/off valves 43A, 48A, and 48B, serving as the flow path switching means for the cooling air, to switch between the flow path used during start-up, in which high-temperature compressed air introduced from the outlet of the compressor 1 is used, and that used during the load operation, in which high-pressure bleed air introduced from the high-pressure stage of the compressor 1 is used, the metal temperature of the blade ring 12 can be reduced by cooling air for the second-stage turbine stator blades. Accordingly, it is possible to perform ACC in which, during start-up, a heating operation is performed using high-pressure, high-temperature compressed air to ensure the tip clearance of the first-stage turbine rotor blades, and, during the load operation, the tip clearance is reduced by using relatively low-temperature, high-pressure bleed air as the cooling air.

Thus, according to the above-described present invention, by allowing cooling air for the second-stage turbine stator blades to flow through the through-holes 16 provided in the blade ring 12, the metal temperature of the blade ring 12 can be reduced. At this time, because active clearance control (ACC) is enabled by switching between cooling air used during start-up and that used during the load operation, it is possible to perform a heating operation by raising the temperature of the cooling air and to ensure the tip clearance required for the first-stage turbine rotor blades during start-up, and it is possible to achieve the minimum tip clearance during the load operation. Accordingly, the need for steam is eliminated in performing ACC, solving the problem of having to postpone start-up until the steam to be used meets certain conditions, which improves the working efficiency of the gas turbine GT.

Figure 5:
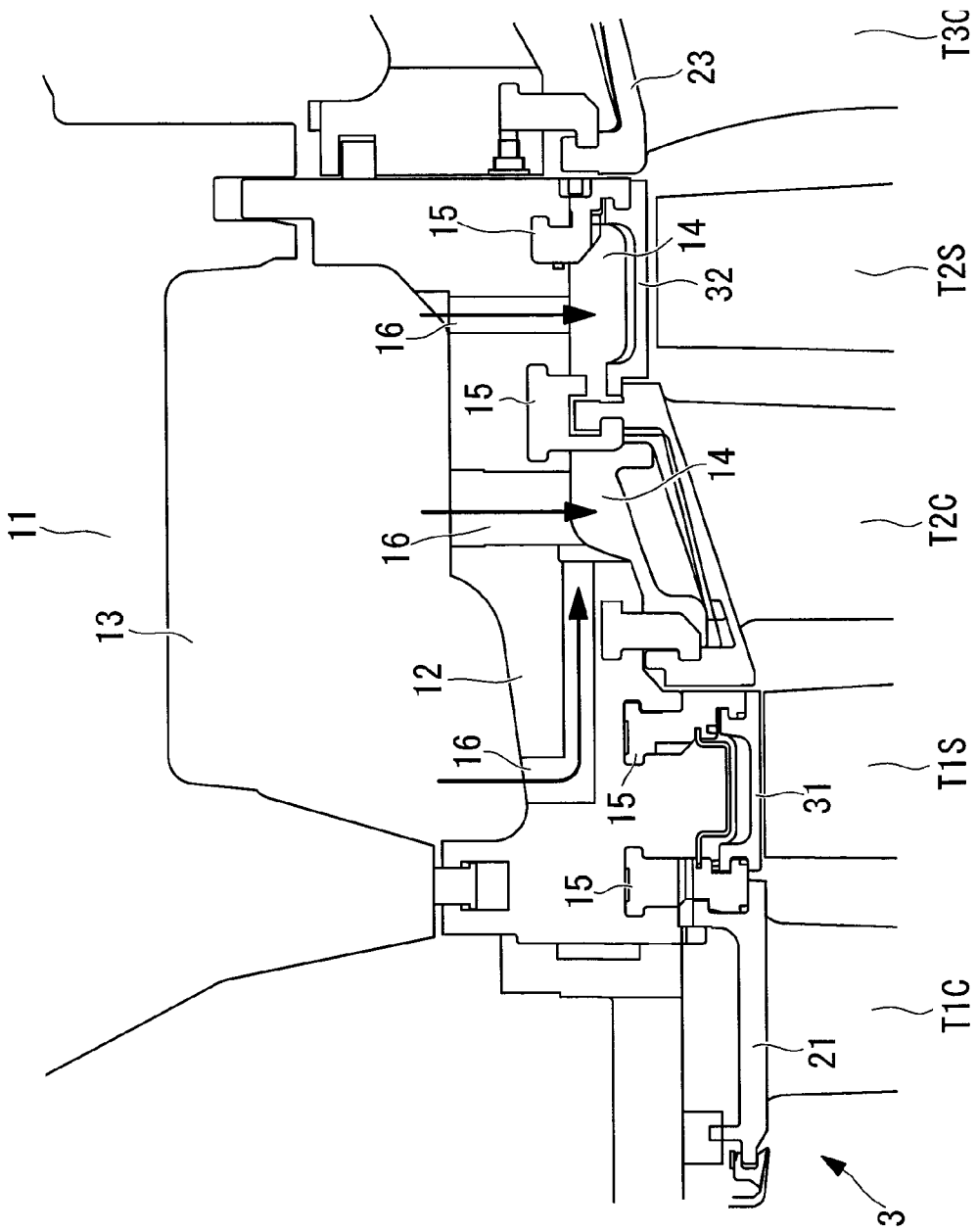
FIG. 5 is a partial sectional view showing a modification of FIG. 1, with respect to the structure of the inlet of the turbine.

The configuration of the above-described inlet of the turbine of the gas turbine GT is not limited to that shown in FIG. 1, but may be the configuration of the modification shown in, for example, FIG. 5. More specifically, compared with the configuration shown in FIG. 1, although a difference exists in the configuration in which the outer casing 11 and the blade ring 12 are fitted together, the same inflow space 13 and the space 14 are formed in the both configurations.

Note that the present invention is not limited to the above-described embodiments, but may be appropriately modified within a scope not departing from the spirit of the present invention.

The invention claimed is:

1. A gas turbine plant including a cooler in an air system used for cooling second-stage turbine stator blades,
    wherein a first-stage segmented ring and a second-stage segmented ring that oppose tips of first-stage turbine rotor blades and second-stage turbine rotor blades are supported by a same blade ring, and a cooling-air for the second-stage turbine stator blades forms a cooling air flow cooling the blade ring, to control thermal expansion of the blade ring and to control a clearance with respect to the tips,
    wherein switching means is provided in the flow path for supplying the cooling air for the second-stage stator blades to allow the cooling air to bypass the cooler during start-up and to allow the cooling air to pass through the cooler during the load operation, so that the flow path is switched between different flow paths during start-up and during load operation, and
    wherein the switching means is configured to switch the flow path to flow a high-temperature compressed air introduced from an outlet of a compressor as the cooling air during start-up operation, and switches the flow path to flow a high-pressure bleed air introduced from a high-pressure stage of the compressor as the cooling air to the flow path during load operation.

2. The gas turbine plant according to claim 1,
    wherein high-pressure bleed air from the compressor is introduced as the cooling air, the flow path bypassing the cooler is selected during start-up, and the flow path passing through the cooler is selected during the load operation.

3. The gas turbine plant according to claim 1,
    wherein during load operation, the high-temperature compressed air is further introduced in the flow path to control the temperature of the cooling air.

4. A device, comprising:
    a gas turbine plant having a first-stage and a second stage and including a cooler section in an air system configured to turbine stator blades of the second-stage of the gas turbine plant, and having a first-stage segmented ring and a second-stage segmented ring that oppose tips of turbine rotor blades of the first-stage and turbine rotor blades of the second stage being supported by a same blade ring, the gas turbine plant configured to operate in at least two modes of operation including a start-up operation and a load operation, wherein positions of at least some of the components of the gas turbine plant are different when the gas turbine plant is in start-up operation vs. the load operation, the gas turbine plant further including:
    a ducting system configured to provide cooling-air for the second-stage turbine stator blades that provides cooling air flow cooling the same blade ring; and
    a switching system configured to provide the cooling air for the second-stage stator blades to allow the cooling air to bypass the cooler section during start-up and to allow the cooling air to pass through the cooler section during the load operation, so that the flow path is switched between different flow paths during start-up and during load operation, wherein the switching system is further configured to direct a high-temperature compressed air introduced from an outlet of a compressor of the gas turbine plant as the cooling air during start-up operation, and to direct a high-pressure bleed air introduced from a high-pressure stage of the compressor as the cooling air during load operation.

5. The device of claim 4, wherein the ducting system is configured to provide cooling-air for the second-stage turbine stator blades that provides cooling air flow cooling the same blade ring, thereby controlling thermal expansion of the blade ring and to control a clearance with respect to the tips.

* * * * *